United States Patent [19]

Meddaugh

[11] Patent Number: 5,008,154
[45] Date of Patent: Apr. 16, 1991

[54] COMPOSITION AND METHOD FOR PRIMING AND COATING SILICONE SUBSTRATES

[75] Inventor: Michael D. Meddaugh, Midland, Mich.

[73] Assignee: Dow Corning Corporation, Midland, Mich.

[21] Appl. No.: 459,858

[22] Filed: Jan. 2, 1990

Related U.S. Application Data

[62] Division of Ser. No. 283,423, Dec. 12, 1988, Pat. No. 4,923,946.

[51] Int. Cl.$^5$ ............................ B32B 9/04; B05D 3/10
[52] U.S. Cl. .................................... 428/447; 427/302; 427/322; 427/387; 427/393.5; 427/412.1; 427/444
[58] Field of Search ............ 427/302, 322, 387, 393.5, 427/412.1, 444; 428/447

[56] References Cited

U.S. PATENT DOCUMENTS

| | | | |
|---|---|---|---|
| 3,567,493 | 3/1971 | Wessel | 427/387 |
| 3,642,518 | 2/1972 | Miki et al. | 427/387 |
| 3,650,808 | 3/1972 | Gagnon | 427/387 |
| 3,706,592 | 12/1972 | Thomson | 427/387 |

*Primary Examiner*—Janyce Bell
*Attorney, Agent, or Firm*—George A. Grindahl

[57] ABSTRACT

A novel primer composition containing a partial hydrolyzate of an aminoalkyl-substituted trialkoxysilane, a carboxylic acid salt of tin and a solvent is applied to a moisture-cured silicone substrate and dried to improve the adhesion of a subsequently applied coating. The composition and method are of particular value for painting a moisture-cured silicone substrate disposed on a support, such as a building sealant used on a window assembly or an encapsulant used on an electrical device.

10 Claims, No Drawings

COMPOSITION AND METHOD FOR PRIMING AND COATING SILICONE SUBSTRATES

This is a divisional of copending application Ser. No. 07/283,423 filed Dec. 12, 1988, now U.S. Pat. No. 4,923,946.

BACKGROUND OF THE INVENTION

The present invention relates to a composition and a method for priming and coating a moisture-cured silicone substrate, and to the coated substrate obtained therefrom. More specifically, the present invention relates to a method comprising treating the surface of a moisture-cured silicone substrate with a new primer composition and thereafter applying a coating composition to the primed surface to provide a silicone substrate having a durably adhered coating composition.

Silicone substrates comprising a cured silicone polymer typically have low surface energies and organic coatings do not wet the surface of the silicone substrate well. Consequently, a poorly or non-adhering overcoating results when one attempts to simply coat a silicone substrate with an organic material.

Several attempts to solve this problem have been disclosed in the art, all involving the mixing of an additional component, typically called an adhesion promoter or a primer or a coupling agent or a paintability component, into a curable silicone composition prior to its being applied and cured. For examples, U.S. Pat. Nos. 3,542,714; 3,812,164; 4,593,065; and 3,957,714 recognize the paintability problem associated with a cured silicone surface and disclosed the addition of rosin, amidoalkylthioalkyl-substituted alkoxysilanes, aminoxy- and/or amido-substituted silicon compounds and calcium carbonate, respectively, to curable silicone compositions to improve the paintability of the composition once it has been cured. U.S. Pat. No. 3,817,894 discloses a silicone latex caulk comprising an amino-functional silane which is said to function as a crosslinking agent and as a curing catalyst for the siloxane copolymer component of the composition. When cured the composition has good paintability with latex or oil-based paints.

This method of achieving paintability of a cured silicone surface has drawbacks. For example, one must mix the additional component into the silicone composition before the composition is cured. Consequently, this method is not available when one wishes to coat an already cured silicone substrate. Furthermore, the mixing of an additional component into a formulated silicone composition may alter the physical properties of the curable and/or cured composition in an undesirable way, while achieving the desired paintability.

Amino-functional silicon compounds have been used to improve the adhesion of various materials to a cured silicone coating; however, it appears that such a method has not been extended to the coating of a silicone substrate. For example, U.S. Pat. No. 4,315,970 claims a method for forming an adherent metal surface on a substrate by treating the substrate with a curable organic or silicone basecoat, curing said basecoat, treating the cured basecoat with at least one organofunctional silane or partial hydrolyzate thereof, drying the silane-treated surface and vapor-depositing a metal on the silane-treated surface. The organofunctional silane has the formula $(RO)_aSi(R)_cR'X$ wherein $—R'X$ can be, for example, $—CH_2CH_2CH_2NHCH_2CH_2NH_2$, and the basecoat is preferably a silicone basecoat, and more preferably a basecoat selected from the siloxane coatings disclosed in U.S. Pat. No. 3,986,997. Also, U.S. Pat. No. 3,477,901 discloses a method for adhering a polyolefin to a substrate comprising treating the substrate with a mixture of silanes, one of which is an amino-functional silane, drying the treated substrate and bonding the polyolefin to the dried substrate using heat and pressure. The substrate can be, for example, a silicone-treated parchment paper.

These methods of overcoating, comprising the use of vapor deposition, mechanical pressure or other complex means, are not suitable for the coating of silicone substrates, such as those one would likely find in the sealants and caulks of a building construction.

Amino-functional silicon compounds have been used extensively to improve the adhesion of a curable silicone composition to various substrates, such as glass, metal, fillers, etc. Mention is made of U.S. Pat. Nos. 3,554,952; 3,888,815 and 4,681,808, the latter disclosing a method for improving the adhesion of a silicone elastomeric coating to a polyurethane substrate comprising applying to the polyurethane substrate a limited amount of a silane having the formula $ZSi(OR)_3$, where Z is an amine-functional radical and R is a monovalent hydrocarbon radical having from 1-6 carbon atoms, and then applying a coating of a specific curable silicone coating to the thus-treated polyurethane substrate.

There is a need for a method for coating a silicone substrate, particularly a building sealant, with a durably adhering protective and/or decorative coating, which does not require the mixing of a component with the silicone prior to its being applied and cured, or the using of complex overcoating methods, such as vapor deposition or mechanical pressure.

BRIEF SUMMARY OF THE INVENTION

It is an object of the present invention to provide a composition and method for priming a cured silicone substrate. More particularly, it is a further object of this invention to provide a primer composition and a method for coating a moisture-cured silicone substrate with a coating composition which will not adheringly separate from the substrate after it has been applied and cured. In a preferred embodiment of this invention it is an object to provide a method for coating a moisture-cured silicone sealant or caulk. It is a further object of this invention to provide a moisture-cured silicone substrate bearing a durably adhered coating.

These objects, and other which will occur to one of ordinary skill in the silicone coatings art, are obtained by the composition and method of this invention which, briefly described, comprises applying a continuous layer of a new primer composition to a moisture-cured silicone substrate, evaporating the solvent from the continuous layer and applying a coating composition thereover.

DETAILED DESCRIPTION OF THE INVENTION

In a first aspect the present invention relates to a primer composition consisting essentially of a partial hydrolyzate of an aminoalkyl-substituted trialkoxysilane, from 0.1 to 10 percent by weight, based on the weight of said partial hydrolyzate, of a carboxylic acid salt of tin and the balance a solvent component.

The partially hydrolyzed aminoalkyl-substituted trialkoxysilane component of the primer composition of this invention can be any partial hydrolyzate of any aminoalkyl-substituted trialkoxysilane, or mixture of aminoalkyl-substituted trialkoxysilanes, having the formula R'NHRSi(OZ)$_3$; herein also referred to as the silane.

Examples of suitable aminoalkyl radicals, —RNHR', of the silane include radicals wherein R is a divalent hydrocarbon radical or a divalent hydrocarbon radical having amino functionality of the formula =NH in which the two bonds of the =NH are bonded to carbon atoms and R' is hydrogen or an alkyl radical having from 1 to 4 carbon atoms per radical, such as methyl, ethyl, propyl, isopropyl, butyl, and isobutyl.

Examples of the R divalent hydrocarbon radicals include methylene, ethylene, the propylenes, the butylenes, the hexylenes, cyclohexylene, and the decylenes.

Examples of the R divalent hydrocarbon radical having amino functionality of the formula =NH in which the two bonds of the =NH are bonded to carbon atoms include
—CH$_2$CH$_2$CH(CH$_3$)NHCH$_2$CH$_2$—,
—CH$_2$CH(CH$_3$)NHCH$_2$CH$_2$—,
—CH$_2$CH(CH$_3$)CH$_2$NHCH$_2$CH$_2$—,
—CH$_2$CH$_2$CH$_2$NHCH$_2$CH$_2$—,
—CH$_2$CH$_2$CH$_2$(NHCH$_2$CH$_2$)$_2$—, and
—CH$_2$CH(CH$_3$)CH$_2$(NHCH$_2$CH$_2$)$_2$—.

The —OZ radicals of the silane can be any alkoxy or substituted alkoxy radicals having from 1–8 carbon atoms, such as methoxy, ethoxy, propoxy, butoxy, 2-ethylhexoxy, isopropoxy, hexyloxy, 2-methoxyethoxy and 2-ethoxyethoxy.

Examples of aminoalkyl-substituted trialkoxysilanes suitable for preparing partial hydrolyzates include:
beta-aminoethyltriethoxysilane,
beta-aminopropyltriethoxysilane,
gamma-aminopropyltrimethoxysilane,
gamma-aminopropyltripropoxysilane,
gamma-aminopropyltri(methoxyethoxy)silane,
N-methyl-gamma-aminopropyltrimethoxysilane,
delta-aminobutyltrimethoxysilane,
(CH$_3$O)$_3$SiCH$_2$CH(CH$_3$)CH$_2$NHCH$_2$CH$_2$NH$_2$,
(CH$_3$O)$_3$SiCH$_2$CH$_2$CH$_2$NHCH$_2$CH$_2$NH$_2$,
(CH$_3$O)$_3$SiCH$_2$CH$_2$CH$_2$(NHCH$_2$CH$_2$)$_2$NH$_2$, and
(CH$_3$O)$_3$SiCH$_2$CH$_2$CH$_2$(NHCH$_2$CH$_2$)$_3$NH$_2$.

The partially hydrolyzed silane component described above has a complex structure with an average unit formula R'NHRSi(OZ)$_a$O$_{(3-a)/2}$ in which R, R', and OZ are the same as defined above and a has an average value of $>0$ to $<3$, such as 0.5, 1.0, 1.5, 2.0 and 2.5. In addition to siloxanes it is to be understood that the partially hydrolyzed silane may also contain silanes, both of which may contain intermediate silanol radicals which have not condensed to form a siloxane bond. Accordingly, the partially hydrolyzed silane having the above unit formula may have some, but not all, of its —OZ radicals replaced by silicon-bonded hydroxyl radicals.

Aminoalkyl-substituted trialkoxysilanes are well known in the silicone art and need no detailed description herein as to their preparation. Some are commercially available.

Partially hydrolyzed aminoalkyl-substituted trialkoxysilanes can be prepared by mixing an aminoalkyl-substituted trialkoxysilane and less than one mol, e.g. 0.1, 0.3, 0.5 or 0.8 mols, of water per mol of silicon-bonded alkoxy radical in the silane, preferably in an alcohol solvent, and allowing the mixture to stand at ambient conditions until the water has been reacted. Alternatively, the mixture can be heated to accelerate the reaction of the water. The alcohol by-product of partial hydrolysis is typically allowed to remain in the partially hydrolyzed silane, although it need not be.

The carboxylic acid salt of tin component of the compositions of this invention can be any carboxylate of tin or alkyltin. Carboxylic acid salts of tin are well known as silanol-condensing catalysts in the silicone art, such as in the moisture curable silicone coating art, and need no delineation herein. Many are commercially available. They are exemplified by dibutyltin diacetate, dibutyltin dilaurate, stannous octoate, dibutyltin di(2-ethylhexoate), and the like.

The solvent component of the primer composition of this invention serves to dilute the other components for subsequent application to a substrate and, with certain solvents, to aid in wetting a substrate. The solvent component is volatile and can be a single compound or a mixture of compounds which dissolves the other components, delineated above. By volatile it is meant that each compound of the solvent has a normal boiling point sufficiently low so as to allow it to evaporate substantially completely from a thin layer of the primer composition at room temperature and pressure.

Examples of solvent compounds suitable for use in this invention include alcohols, such as methanol, ethanol, the propanols, the butanols and the cyclic and acyclic hexanols; hydrocarbons, such as the cyclic and acyclic pentanes, hexanes and heptanes, benzene, toluene, the xylenes and mineral spirits; halogenated hydrocarbons, such chlorothene and methylene chloride; cyclic and acyclic hydrocarbon and glycol ethers; and siloxanes, such as hexamethyldisiloxane. Preferably only the alcohols are used in the solvent component of the primer composition. In addition the butanols are preferred alcohols for the solvent component of the primer composition.

The amount of partial hydrolyzate of an aminoalkyl-substituted trialkoxysilane component in the primer composition of this invention is not known to be critical and can range from 1 to 99 percent, preferably from 5 to 50 percent, based on the weight of the primer composition, and the amount of the carboxylic acid salt of tin component ranges from 0.1 to 10 percent by weight, based on the weight of the partial hydrolyzate of aminoalkyl-substituted trialkoxysilane. The solvent component and any other components which are typical components in primer compositions comprises the balance of the primer composition of this invention.

A preferred primer composition of this invention consists essentially of from 10 to 30 parts by weight of a partial hydrolyzate of (MeO)$_3$SiCH$_2$CH$_2$CH$_2$NHCH$_2$CH$_2$NH$_2$, from 1 to 3 parts by weight dibutyltin diacetate and the balance to 100 parts by weight, i.e. from 67 to 89 parts by weight, is t-butanol and i-propanol.

The primer compositions of this invention can be prepared by first preparing, in the manner noted above, the partially hydrolyzed aminoalkyl-substituted trialkoxysilane, in a solvent such as isopropanol; mixing any additional solvent, preferably t-butanol, therewith and mixing the carboxylic acid salt of tin, preferably dibutyltin diacetate, therewith. Alternatively, the silane, water, alcohol, any additional solvent and tin salt can be mixed and the mixture allowed to stand at ambient conditions and/or heated until the water has been reacted. The primer composition of his invention should be maintained substantially anhydrous until it is to be used.

If the primer composition is not going to be used in the near future, such as for example a month or more, the partial hydrolyzate of aminoalkyl-substituted trialkoxysilane and the carboxylic acid salt of tin are not mixed together until the primer composition is to be used. In such a case the primer composition consists essentially of a first composition containing all of the carboxylic acid salt of tin and, optionally, a portion of the solvent, and a second composition containing all of the partial hydrolyzate of aminoalkyl-substituted trialkoxysilane, and the remaining portion of the solvent component. The first and second compositions are then mixed when desired.

Thus, it is within the scope and spirit of this invention to store the partial hydrolyzate of aminoalkyl-substituted trialkoxysilane and carboxylic acid salt of tin in separate, but related, containers until one desires to use the primer composition. By separate, but related, containers it is meant any arrangement of two or more containers which will keep the partial hydrolyzate aminoalkyl-substituted trialkoxysilane and the carboxylic acid salt of tin apart, but which clearly indicates that they are to be mixed together in preparation for using the primer composition of this invention.

Examples of separate, but related, containers include two or more bottles, cans, tubes, vials, drums, pails or etc. packaged together, such as in a box or on a pallet; two or more of said containers, including tankers and tank cars, bearing labels which relate the containers to each other; and a single package having two or more compartments which are separate containers but which can be caused to communicate, thereby mixing their contents. The reader will be able to contemplate other arrangements of separate, but related, containers, which are included in the scope and spirit of this invention and which will provide the primer composition of this invention.

In a second aspect the present invention relates to a method comprising applying a continuous layer of a primer composition to a moisture-cured silicone substrate, said primer composition consisting essentially of a partial hydrolyzate of an aminoalkyl-substituted trialkoxysilane, from 0.1 to 10 percent by weight, based on the weight of said partial hydrolyzate, of a carboxylic acid salt of tin and the balance a solvent component; and, evaporating the solvent from the continuous layer of primer composition to provide a primed silicone substrate.

In the method of this invention the primer composition of this invention, including preferred embodiments thereof, is applied to a moisture-cured silicone substrate, herein also referred to as a substrate.

The moisture-cured silicone substrate that is treated by the method of this invention can be any substrate that is obtained by exposing a moisture-curable silicone composition to moisture until its surface becomes tack-free. Typically the moisture-cured substrate is sufficiently cured to have a solid form, such as an elastomeric or rigid material. Examples of moisture-cured silicone substrates include sealants, caulks, glazings, encapsulants, adhesives, and coatings.

Moisture-curable silicone compositions are well known in the silicones art and need no extensive delineation herein. Generally, moisture-curable silicone compositions are of the one-package type that are ready to use; they give off either an acid, typically acetic acid, or a non-acid, such as an alcohol or a ketoxime, while curing. The disclosures of U.S. Pat. Nos. 3,035,016; 3,184,427; 3,122,522; 3,766,127; 3,766,128; 3,061,565; 3,161,614; 3,077,465; 3,294,739; 3,175,993; 3,499,859; 3,109,013 and 4,595,610 are incorporated herein to show the types of moisture-curable silicone compositions that provide substrates which can be treated by the method of this invention.

The primer composition of this invention can be applied to a moisture-cured silicone substrate at any time after the silicone substrate has cured tack-free, i.e. has skinned-over. Preferably the silicone substrate has been exposed to moisture for from 30 minutes to less than 24 hours, preferably from about 1 to 4 hours, before the primer composition is applied thereto.

Any means, or combination of means, for applying the primer composition to the silicone substrate may be used as long as the primer composition layer is continuous, i.e. free of discontinuities, such as streaks or holes, commonly called "fish-eyes". The primer composition is merely brought into contact with the surface of the substrate, such as by brushing and/or spraying, and allowed to dry.

Any solvent remaining in the continuous layer of primer composition after it has been applied to the surface of the silicone substrate is then allowed, or is caused to, evaporate substantially completely in the usual manner. The means of evaporating the solvent is not a critical element of the method of this invention. After the solvent has been removed from the continuous layer of primer composition the substrate is a primed substrate and is ready to receive a coating composition.

Thus, the method of this invention further comprises applying one or more layers of a coating composition to the primed substrate obtained by the method of this invention. It has been found that the primed substrate should be air-dried, i.e., exposed to ambient conditions, for a sufficient length of time, such as at least 4 hours, before being coated with a coating composition, in order to obtain maximum adhesion of the coating to the substrate after drying. It has also been found that the adhesion of the dried coating is excellent after a period of, for example 24 hours, and continues to improve with time.

The coating composition that is applied to the primed substrate can be, for example, any of the well known air-drying latex or oil-based coatings that are suggested for indoor or outdoor use in the home and commercial construction industry, abrasion-resistant coatings, and the like.

The composition and method of this invention provides an article of this invention comprising a moisture-cured silicone substrate bearing a coating composition durably adhered thereto with a continuous primer layer consisting essentially of the composition obtained by drying a primer composition consisting essentially of a partial hydrolyzate of an aminoalkyl-substituted trialkoxysilane, from 0.1 to 10 percent by weight, based on the weight of said partial hydrolyzate, of a carboxylic acid salt of tin and the balance a solvent component.

The moisture-cured silicone substrate, the primer composition and the coating composition of the article of this invention are to be any of those disclosed above, including preferred embodiments thereof.

In a preferred embodiment of this invention the article of this invention further comprises a support upon which the moisture-cured silicone substrate is disposed. Supports contemplated herein can be made of any useful material, such as cellulosic, such as wood or cotton;

metallic, such as aluminum, copper or iron; plastic, such as vinyl, polyester or nylon; siliceous, such as glass, cement, brick, mortar, concrete, and combinations thereof; and can take any form, such as a building component, such as a window assembly or plumbing fixture; an encapsulated and/or sealed electrical and/or electronic device, such as a circuit board, a microcircuit, a switch or a military "black box"; or a work of art or handicraft.

The continuous primer layer that one obtains by drying a primer composition of this invention is a complex material consisting essentially of aminoalkyl radicals, as delineated above, bonded to silicon atoms, and compounds of tin. Additionally, it is believed that the silicon atoms of the primer layer are bonded, to a lesser extent, to the surface of the silicone substrate, and to a greater extent, to each other by way of siloxane bonds; thereby providing a primer layer which has considerable siloxane character and which is, to a great extent, absorbed by the silicone substrate. Small amounts of silicon-bonded hydroxyl radicals may also be present in the primer layer.

The following examples are disclosed to further teach how to practice, but not to limit, the present invention which is properly delineated by the claims appended hereto.

Adhesion of a coating to a primed silicone elastomeric substrate was measured by a sequence of three tests after the applied coating had air-dried.

The first test consisted of applying a piece of cellophane tape to the coating and then pulling it off. If the coating did not come off the primed substrate with the cellophane tape the second test was performed.

The second test consisted of stretching the coated elastomeric substrate 100% vertically and 100% horizontally, resulting in the rupture of the coating layer into small pieces. If the pieces of coating resisted removal from the primed substrate while being scratched the adhesion of the coating was considered to be excellent and the third test was performed.

The third test, known as the Cross Hatch test, consisted of cutting through the coating layer and into the substrate, a $10 \times 10$ grid measuring 1 inch on a side and containing $100 - 0.1 \times 0.1$ inch squares. A piece of masking tape was firmly applied to the squares and peeled off at an angle of 180° (O radians). The number of 0.1 inch squares remaining on the substrate was counted and was expressed as a percentage of the total number of squares covered by the masking tape.

EXAMPLE 1

A 50% by weight solution of $(CH_3O)_3Si(CH_2)_3NHCH_2CH_2NH_2$ in i-propanol was mixed with 1.5 mols of water per mol of silane and the mixture was allowed to stand at room temperature overnight to provide an alcohol solution of partial hydrolyzate. To 30 parts by weight of the resulting partial hydrolyzate solution was added 68 parts by weight of t-butanol and 2 parts by weight of dibutyltin diacetate to provide a primer composition of this invention.

EXAMPLE 2

The primer composition of Example 1 was brushed onto the surface of several samples of a moisture-curing, acetic acid-releasing silicone sealant at various times during their curing and allowed to air-dry for 24 hours, thus removing substantially all of the alcohols from the applied primer layer. The primer composition coated the cured sealant in a continuous layer and did not "fish-eye". On the other hand, an identical primer composition, except containing no dibutyltin diacetate, "fish-eyed" and was not further tested. Samples of latex and oil-based house paints were applied to the sealant primed by the composition of this invention and the paints were allowed to air-dry for 7 days before being tested for adhesion. The results of the Cross Hatch test are given in the Table.

TABLE

| SEALANT CURING TIME | CROSS HATCH ADHESION - % | |
|---|---|---|
| | OIL-BASED PAINT | LATEX PAINT |
| 0 Seconds | 79 | 61 |
| 10 Minutes | 63 | 36 |
| 30 Minutes | 85 | 100 |
| 1 Hour | 92 | 100 |
| 2 Hours | 100 | 100 |
| 4 Hours | 98 | 100 |
| 24 Hours | 50 | 92 |

That which is claimed is:

1. A method comprising applying a continuous layer of a primer composition to a moisture-cured silicone substrate, said primer composition consisting essentially of a partial hydrolyzate of an aminoalkyl-susbstituted trialkoxysilane, prepared by mixing an aminoalkyl-substituted trialkoxysilane and less than one mol of water per mol of silicon-bonded alkoxy radical in the silane, from 0.1 to 10 percent by weight, based on the weight of said partial hydrolyzate, of a carboxylic acid salt of tin and the balance a solvent component; and evaporating the solvent component from the continuous layer of primer composition to provide a primed silicone substrate.

2. A method according to claim 1 wherein the primer composition consists essentially of from 10 to 30 parts by weight of a partial hydrolyzate of $(CH_3O)_3SiCH_2CH_2CH_2NHCH_2CH_2NH_2$, from 1 to 3 parts by weight of dibutyltin diacetate, and the balance to 100 parts by weight is t-butanol and i-propanol.

3. A method according to claim 2 wherein a coating composition is applied to the primed substrate.

4. A method according to claim 3 wherein the coating composition is a water-based paint and the moisture-cured silicone substrate has been exposed to moisture for at least approximately 30 minutes before the primer composition is applied thereto.

5. A method according to claim 3 wherein the coating composition is an oil-based paint and the moisture-cured silicone substrate has been exposed to moisture for from approximately 30 minutes to 4 hours before the primer composition is applied thereto.

6. An article comprising a moisture-cured silicone substrate bearing a coating composition durably adhered thereto with a continuous primer layer consisting essentially of the composition obtained by drying a primer composition consisting essentially of a partial hydrolyzate of an aminoalkyl-substituted trialkoxysilane prepared by mixing an aminoalkyl-substituted trialkoxysilane and less than one mol of water per mol of silicon-bonded alkoxy radical in the silane, from 0.1 to 10 percent by weight, based on the weight of said partial hydrolyzate, of a carboxylic acid salt of tin and the balance a solvent component.

7. The article according to claim 6 wherein the primer composition consists essentially of from 10 to 30 parts by weight of a partial hydrolyzate of $(CH_3O)_3SiCH_2CH_2CH_2NHCH_2CH_2NH_2$, from 1 to 3 parts by weight of dibutyltin diacetate, and the balance of 100 parts by weight is t-butanol and i-propanol.

8. The article according to claim 7 further comprising a support upon which the silicone substrate is disposed.

9. The article according to claim 8 wherein the coating composition is an oil-based paint.

10. The article according to claim 8 wherein the coating composition is a water-based paint.

* * * * *